June 6, 1933.   T. M. PARDUE ET AL   1,912,721
AIRPLANE INSTRUCTION DEVICE
Filed May 15, 1930   6 Sheets-Sheet 5
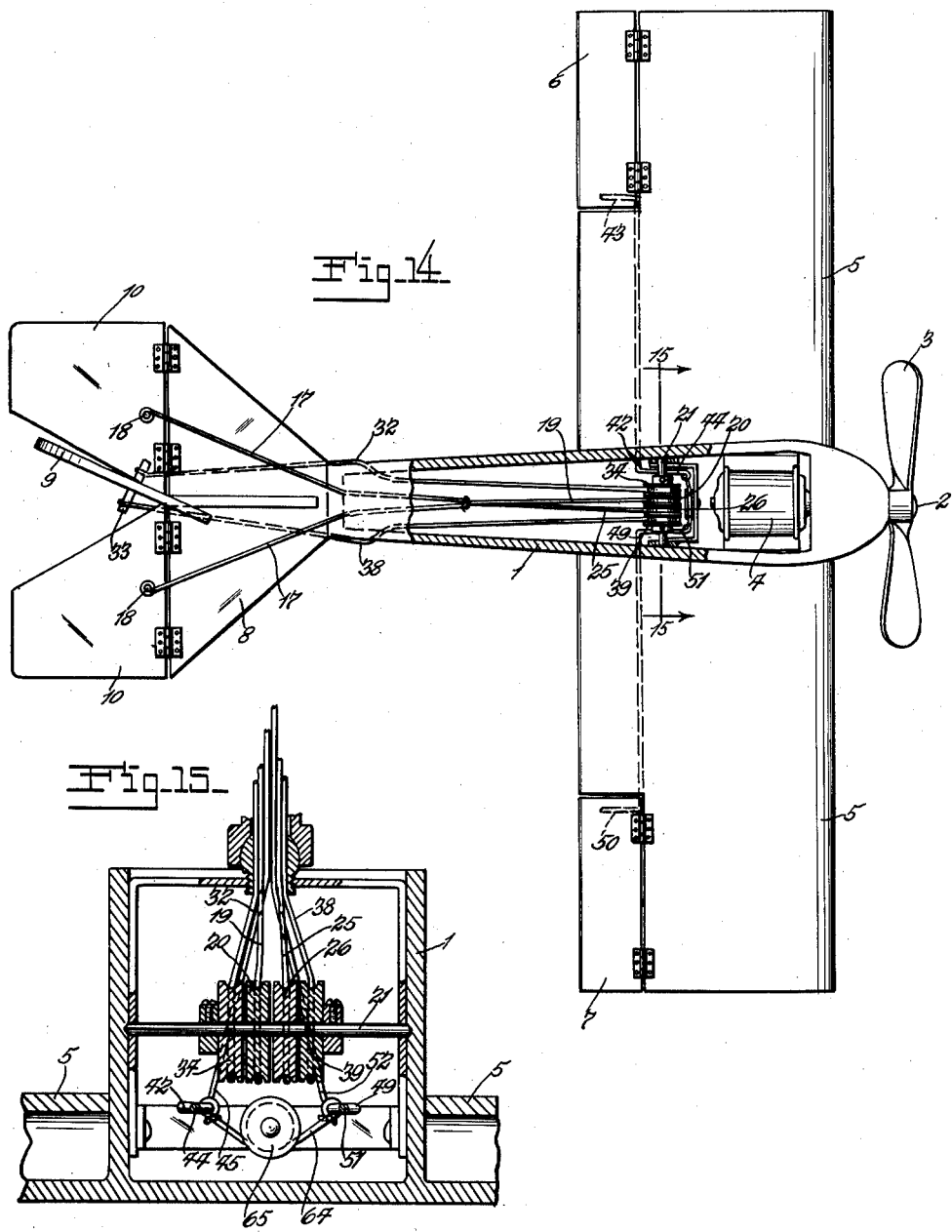

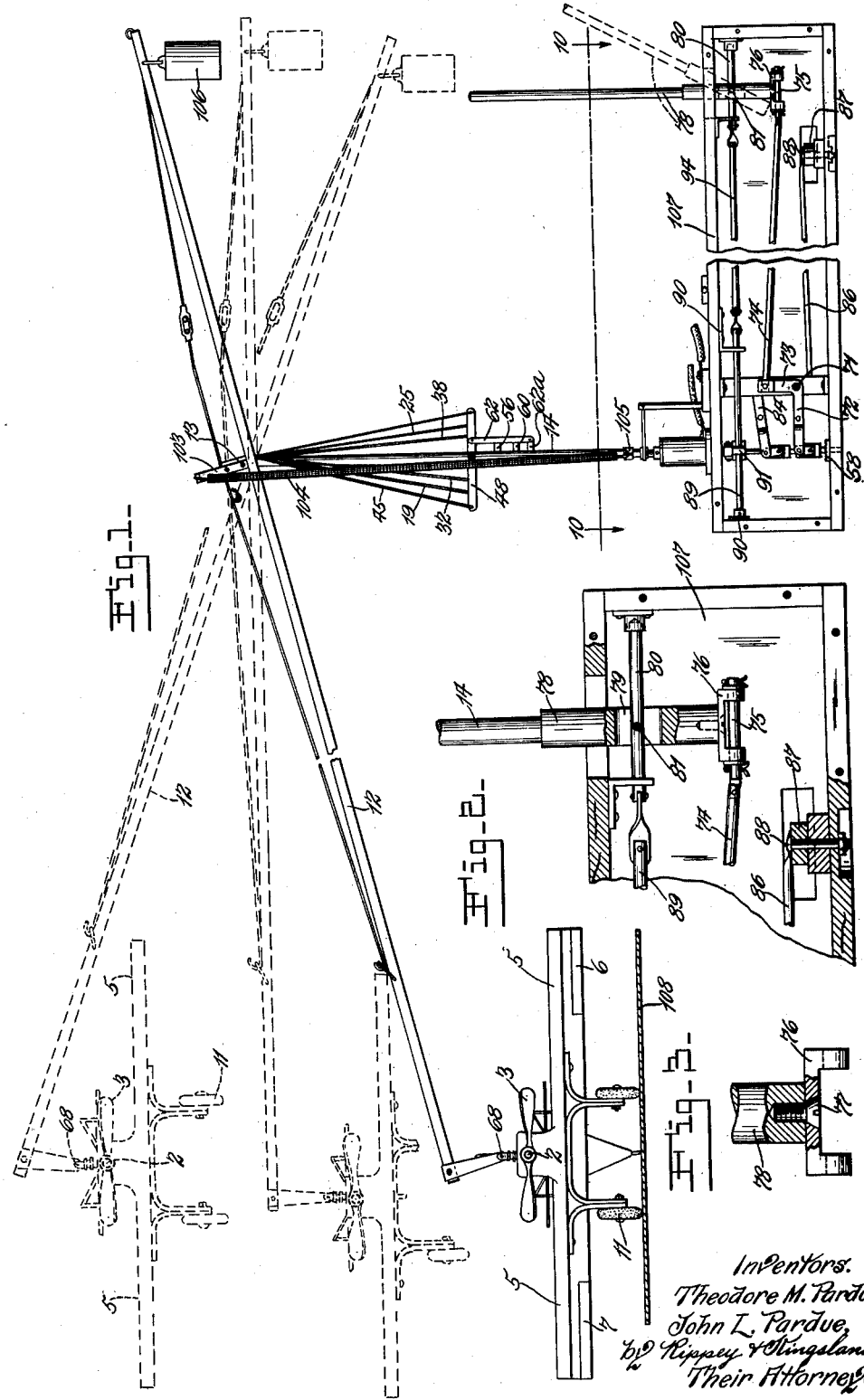

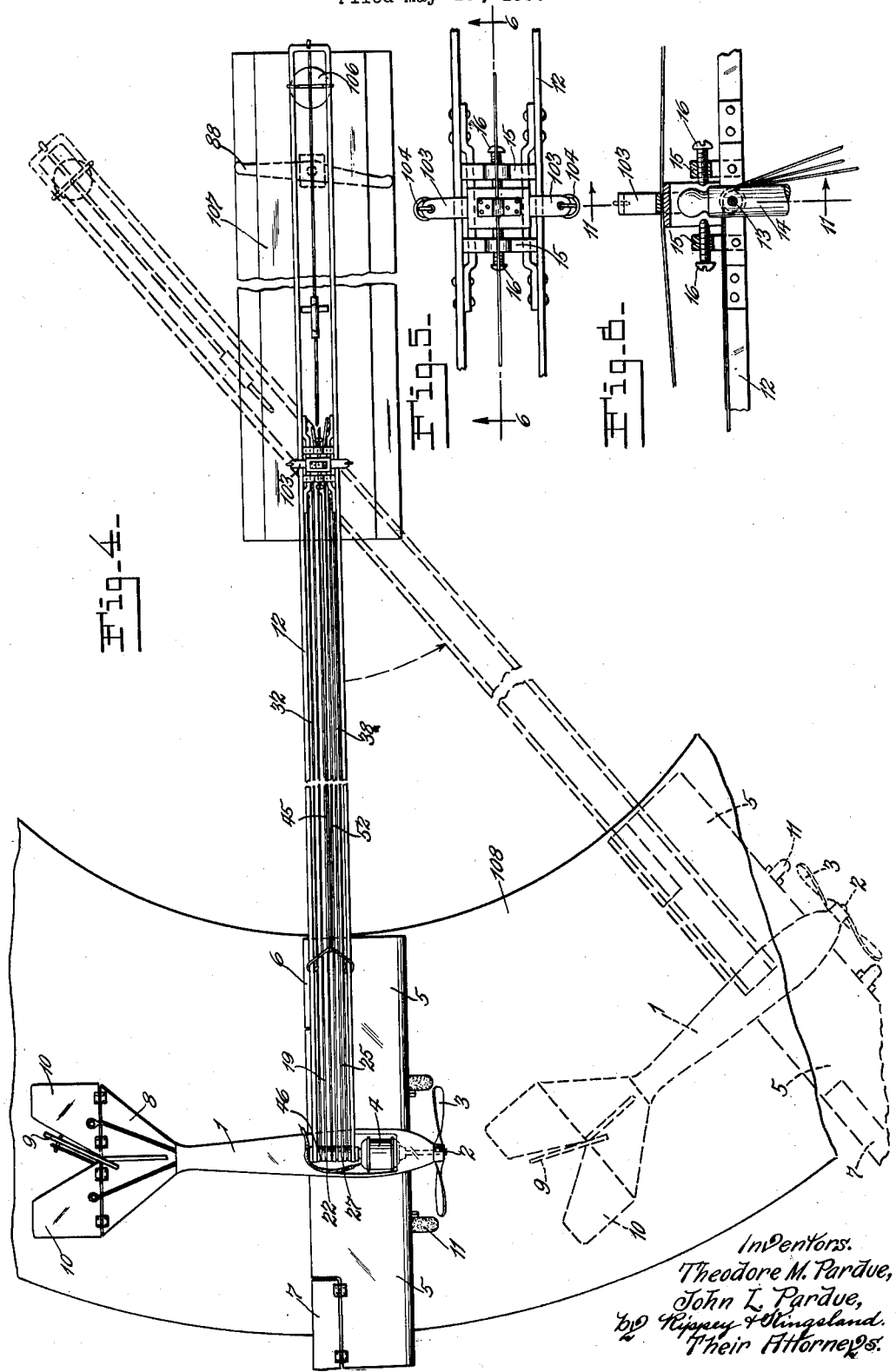

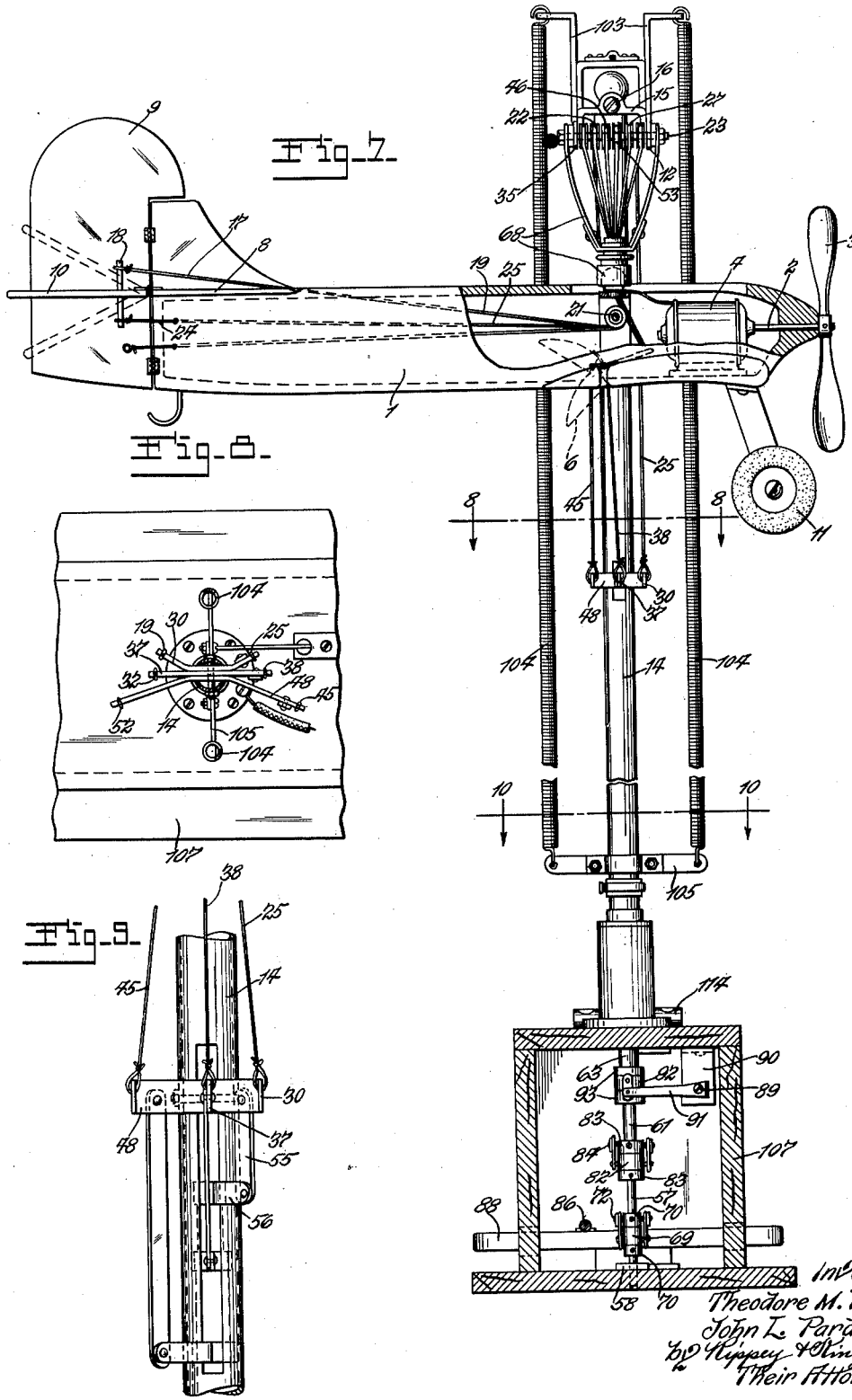

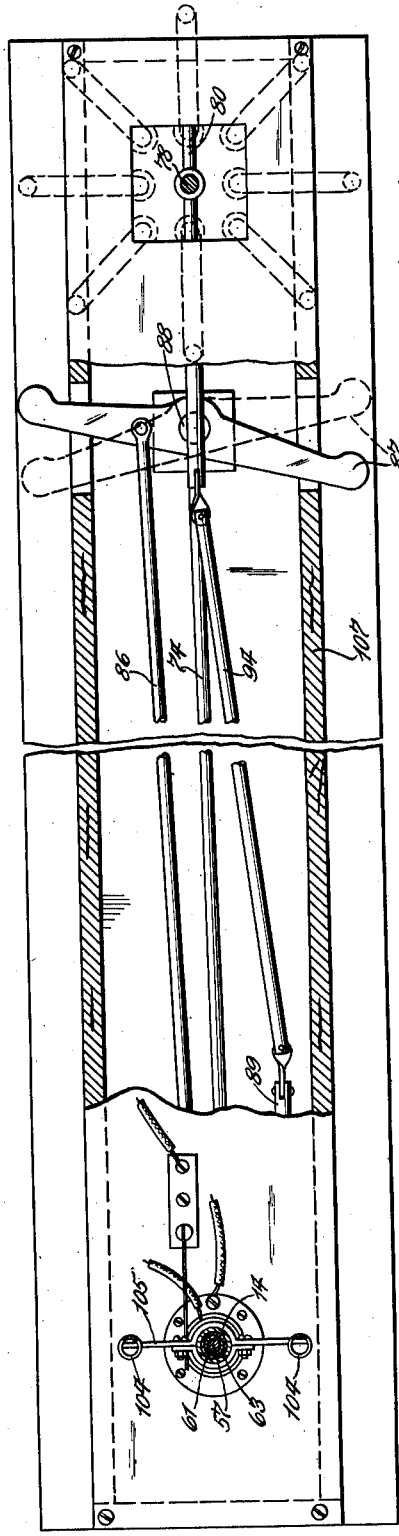
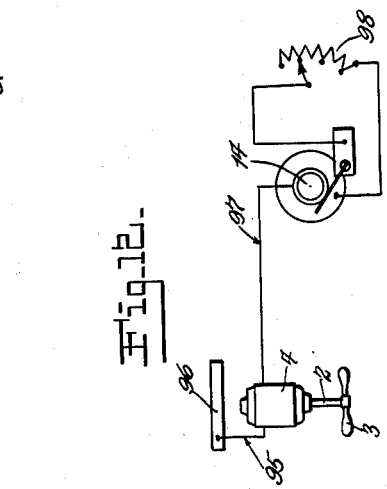
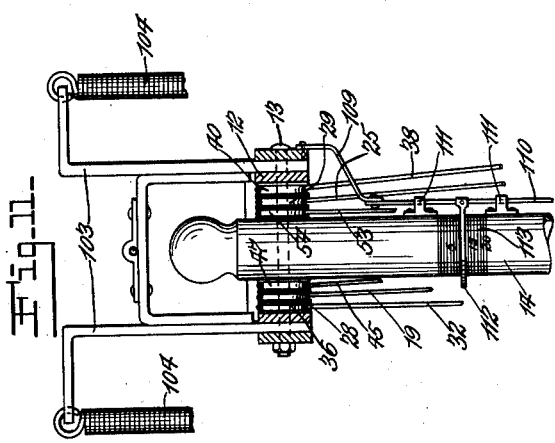

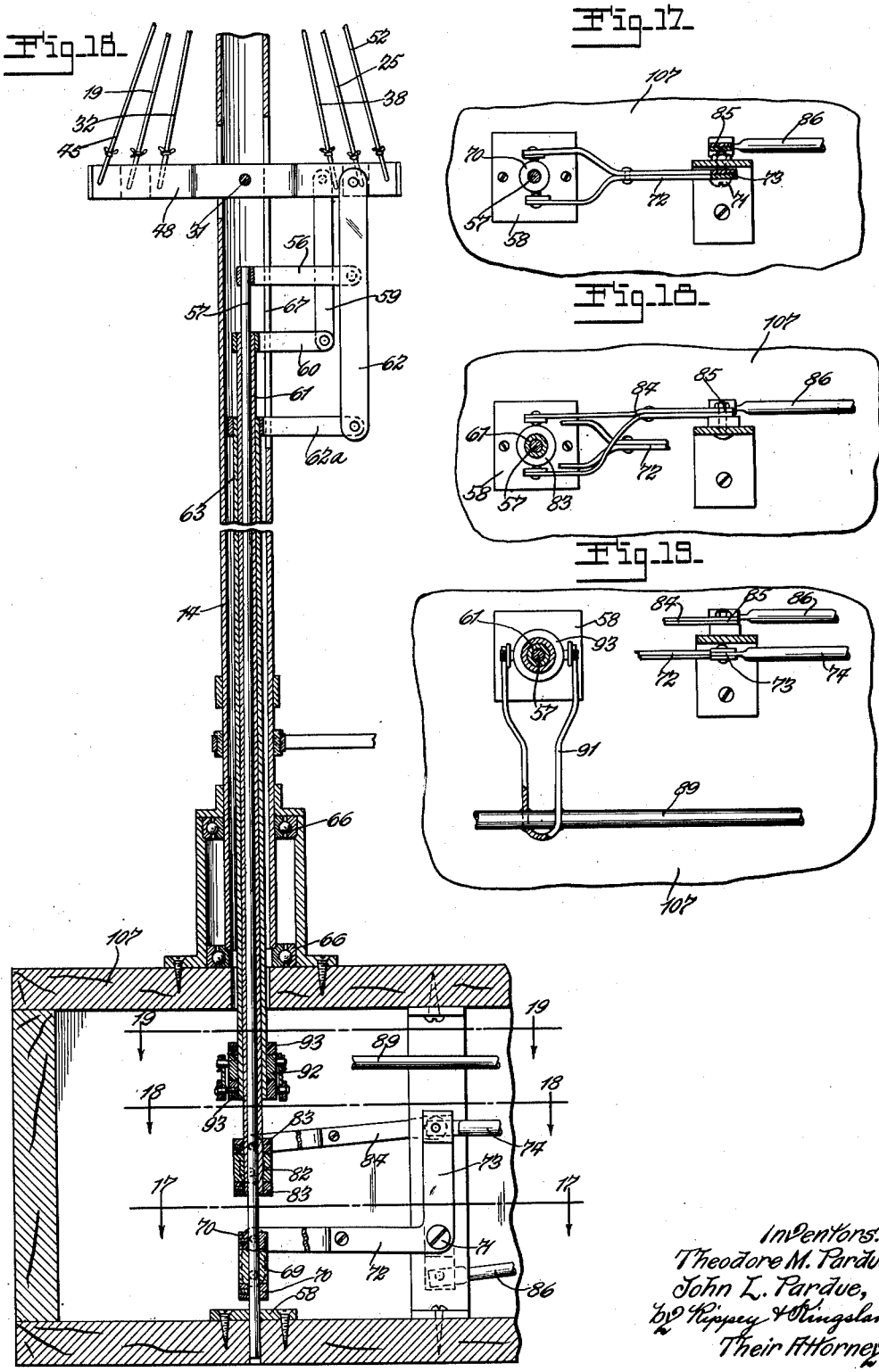

Patented June 6, 1933

1,912,721

UNITED STATES PATENT OFFICE

THEODORE M. PARDUE AND JOHN L. PARDUE, OF ST. LOUIS COUNTY, MISSOURI

AIRPLANE INSTRUCTION DEVICE

Application filed May 15, 1930. Serial No. 452,557.

This invention relates to airplane instruction devices for use in demonstrating the construction and the operations of airplanes, and has special reference to devices for demonstrating the operations of airplanes in actual flight.

An object of the invention is to provide means for suspending an airplane, or a model of an airplane, and mechanism for supporting said airplane, or model, and for operating the same in actual flight so as to demonstrate said operations and the effects thereof, thus enabling the student or observer to make close study and observation of the actions and operations of the different mechanisms and parts of an airplane, and the effects of such actions and operations, and thereby derive a clear understanding of the functions, purposes, uses and modes of operation of all the parts.

Another object of the invention is to provide mechanism for suspending the airplane preparatory for flight and during flight, and connections operable from a stationary point for controlling and operating the ailerons, elevators, and rudder of the airplane while the airplane propeller is operated by a motor mounted on the airplane, so that the airplane may be controlled by the person located at the control devices, and the airplane may be observed and studied from various positions.

Another object of the invention is to provide improved means for controlling the operation of the motor.

Other objects will appear from the following description, reference being made to the accompanying drawings, in which—

Fig. 1 is a side elevation of our improved airplane instruction device, the airplane being indicated in different positions.

Fig. 2 is an enlarged view showing the mounting of the control devices.

Fig. 3 is a sectional view showing the swivel connection of the control or lever with one of the parts operated thereby.

Fig. 4 is a plan view of the device.

Fig. 5 is an enlarged plan view showing the connection of the swinging arm that supports the airplane, with the mast on which the swinging arm is pivoted.

Fig. 6 is a sectional view approximately on the line 6—6 of Fig. 5.

Fig. 7 is an enlarged elevation of the airplane supporting mechanism, parts being shown in section.

Fig. 8 is a cross-sectional view approximately on the line 8—8 of Fig. 7.

Fig. 9 is a further enlargement of a part of the operating connections shown in Fig. 7.

Fig. 10 is a sectional view of the mast approximately on the lines 10—10 of Fig. 1 and Fig. 7, a part of the top wall of the cabinet being removed.

Fig. 11 is a sectional view approximately on the line 11—11 of Fig. 6.

Fig. 12 is a diagrammatic view of the electric circuit for operating the airplane motor.

Fig. 13 is a view showing a motor device for rotating the mast.

Fig. 14 is a plan view of the airplane, part being in section, to show the connections for controlling the rudder and the elevators.

Fig. 15 is a cross-sectional view of the airplane approximately on the line 15—15 of Fig. 14.

Fig. 16 is a vertical sectional view of the mast and a part of the connections for operating and controlling the airplane devices.

Fig. 17 is a cross-sectional view on the line 17—17 of Fig. 16.

Fig. 18 is a cross-sectional view on the line 18—18 of Fig. 16.

Fig. 19 is a cross-sectional view on the line 19—19 of Fig. 16.

The airplane, or model airplane, shown comprises a fuselage 1, a propeller shaft 2, a propeller 3 attached to said shaft 2 beyond the front end of the fuselage, a motor 4 for rotating the shaft 2 and thereby the propeller 3, wings 5 attached to the fuselage in a desired relationship, an aileron 6 hinged to the left wing 5, an aileron 7 hinged to the right wing 5, a stabilizer 8 attached to the rear end of the fuselage 1, a rudder 9 hinged to the rear end of the fuselage rearwardly of the stabilizer 8, a pair of elevators 10 hinged to the rear edge of the stabilizer 8 and having their adjacent edges diverging rearwardly so as to permit lateral swinging movements of the rudder 9, and a landing gear 11. This airplane is pivotally supported by one end of a bar 12 mounted for vertical swinging movements on a horizontal pivot 13 supported near the upper end of a vertical rotary tubular mast 14. The mast 14 extends between the side members of the bar 12 and supports a pair of brackets 15 between which the upper end of the mast 14 extends. Abutments 16 are mounted in the brackets 15 and are designed and arranged to engage the respective opposite sides of the mast 14 so as to limit extent of vertical swinging movements of said bar. These abutments 16 are preferably screwed into the brackets 15 so as to permit adjustment of said abutments to vary extent of vertical swinging movements of said bar 12, as desired.

Flexible members 17 have their rear ends connected with the upper ends of pins 18 projecting through and secured to the elevator sections 10. The forward ends of said flexible members 17 are connected with a single flexible member 19 that passes under a sheave 20 rotative on an axle 21 extending transversely across the fuselage 1. The connection 19 extends upwardly from the sheave 20 over a sheave 22 mounted on an axle 23 supported by the bar 12. Flexible members 24, similar to the members 17, are connected to the lower ends of the pins 18 below the elevators 10, and have their forward ends extending into the fuselage 1 and connected with a flexible connection 25 that passes under a sheave 26, and thence upwardly over a sheave 27, rotative on the axle 23. Obviously, pulls exerted on the connections 19 and 25, respectively, will move the elevators 10 upwardly or downwardly, as the case may be, thus directing the front end of the airplane upwardly or downwardly when the airplane is in flight. From the sheaves 22 and 27, the flexible connections 19 and 25 pass along the bar 12 and over sheaves 28 and 29, respectively, that are rotative on the pivot 13, and thence downwardly to connection with the opposite ends of the lever 30. The lever 30 extends across and through the mast 14 and is mounted on a pivot 31.

A flexible member 32 is connected to one end of a pin 33 extending through the rudder 9, and extends forwardly through the fuselage 1, under a sheave 34 rotative on the axle 21, and thence upwardly over a sheave 35 on the axle 23, and thence along the bar 12 and over a sheave 36 on the pivot 13, and thence downwardly to connection with one end of a lever 37 extending through the mast 14 and mounted on the pivot 31 (Fig. 18). From the opposite end of the pin 33, a flexible connection 38 extends forwardly through the fuselage 1 under a sheave 39 on the axle 21, and thence upwardly over a sheave 40 on the axle 23, and thence along the bar 12 to a sheave 41, and thence downwardly to connection with the opposite end of the lever 37.

A rod 42 is supported by the left wing 5 and has, on its outer end, an angular extension 43 (Fig. 14) connected with the aileron 6 so that rocking movements of said rod 42 will raise and lower said aileron 6. The inner end of the rod 42 has an angular extension 44 within the fuselage 1 from which a flexible connection 45 extends upwardly over a sheave 46 on the axle, and thence along the bar 12 to a sheave 47 on the pivot 13, and thence downwardly to connection with one end of a lever 48 mounted on the pivot 31.

A rod 49 is supported by the other wing 5 of the airplane and has, on its outer end, a crank extension 50 connected with the aileron 7 and, on its inner end, a crank extension 51 from which a flexible connection 52 extends upwardly over a sheave 53 on the axle 23, and thence along the bar 12 and over a sheave 54 on the pivot 13, and thence downwardly to connection with the opposite end of the lever 48.

The elevator operating lever 30 is connected by a link 55 with an arm 56 attached to the upper end of a rod 57 having its lower end mounted in a guide 58 (Fig. 16). Upward movement of the rod 57 will operate the lever 30 and the connection 19 therefrom to raise the elevators 10, and downward movement of the rod 57 will operate the connection 25 therefrom to lower the elevators 10.

A link 59 connects the rudder lever 37 with an arm 60 attached to a tube 61 through which the rod 57 extends. The tube 61 is capable of vertical movements in opposite directions from a starting position, so as to operate the lever 37 and thereby the connections 32 and 38 to operate the rudder 9.

A link 62 connects the aileron lever 48 with an arm 62ª attached to a tube 63 which is capable of vertical movements in opposite directions from a starting position, so as to operate the lever 48, and thereby the connections 45 and 52. These connections 45 and 52 will rock the rods 42 and 49, respectively, so as to operate the ailerons 6 and 7. The two crank arms 44 and 51 are connected by a flexible member 64 passing under a sheave 65 (Fig. 15), whereby each of said rods 42 and 49 will operate the other, but in the opposite direction. That is, when the connection 45 is operated to raise the end of the crank extension 44 so as to rock the rod 42 in a direction to lower the aileron 6, the connection 64 will rock the rod 49 in the opposite direction, so as to raise the aileron 7, and vice versa.

The mast 14 is mounted for rotation in bearings 66 and encloses the upper portions of the members 57, 61 and 63. These members 57, 61 and 63 rotate with the mast 14 and are movable longitudinally with respect to each other and with respect to said mast. The arms 56, 60 and 62ª project through a vertical slot 67 in the mast 14 to their respective connecting links.

It is now clear that when the motor 4 is operating, the propeller 3 will operate the airplane as in flight. Such operation is in a circular course, the mast 14 rotating in its bearings and the members 57, 61 and 63 being rotated with the mast. These members 57, 61 and 63 may be independently operated while the airplane is in flight, so as to operate the various airplane parts controlled thereby exactly as said parts would be operated on a real airplane. These parts will control the positions of the airplane exactly as if the airplane were not supported by the supporting arm. For instance, the rudder 9 will change the horizontal direction of the longitudinal axis of the airplane by causing the airplane to head in different horizontal directions with respect to its orbit; the elevators 10 will cause the airplane to head upwardly or downwardly, and the ailerons 6 and 7 will function to tilt the airplane. All of these movements can be observed and studied so as to understand the effects of these controls. The pivotal connection 68 of the airplane with the bar 12 is of a familiar universal type of pivot and permits free operation of the airplane by these various controls. This conventional type of universal pivot is sufficiently shown in Fig. 7 of the drawings. This pivot permits the airplane to head upwardly or downwardly from the horizontal by manipulation of the elevators 10 and to be turned so as to incline the longitudinal axis of the airplane inwardly or outwardly from the orbit of the airplane.

A collar 69 (Fig. 16) is mounted on the rod 57 between two retaining collars 70 that are attached to said rod. This construction permits the rod 57 to rotate while the collar 69 remains stationary. A bell crank lever is mounted on a pivot 71 and has the arm 72 pivoted to the collar 69 and the arm 73 pivoted to one end of a link 74. The opposite end of the link 74 is pivoted to a rod section 75 supported by a bracket 76. A screw 77 (Figs. 2 and 3) passes through the bracket 76 and into the lower end of a lever or stick 78. The lever or stick 78 has therethrough a hole 79 through which a bar 80 extends. A pivot 81 passes through the bar 80 and pivotally supports the lever or stick 78. Thus, the lever or stick 78 may be operated to raise and lower the rod 57 and thereby operate the elevators 10.

A collar 82 is mounted on the tube 61 between retaining collars 83 that are attached to said tube. A bell crank lever has one arm 84 pivoted to the collar 82 and the opposite arm 85 extending downwardly and pivoted to one end of a link 86, the opposite end of which is pivoted to a lever 87. The lever 87 is mounted on a pivot 88 and is operative to move the tube 61 upwardly or downwardly, and thereby operate the connections from said tube to the rudder 9.

A rod 89 is supported for rocking movements in supporting bearings 90. Said rod 89 is attached to one end of a lever 91 (Fig. 19). The opposite end of said lever 91 is pivoted to a collar 92 mounted on the tube 63 between retaining collars 93. The rod 89 is connected with the bar 80 by a link 94, so that when the said bar 80 is rocked by the lever or stick 78, the tube 63 is thereby moved upwardly or downwardly to operate the connections therefrom, whereby the ailerons 6 and 7 are operated.

An appropriate electric circuit for energizing the motor 4 is shown in Fig. 12. One wire 95 of the electric circuit to the motor is connected to a ground 96, and the other wire 97 is in connection with a switch device 98 operative to open and close the circuit. The switch device may be located on some stationary support and the wiring extended to the motor through the mast 14, or otherwise appropriately arranged.

An alternative driving mechanism is shown in Fig. 13. As there shown, a gear wheel 99 is attached to the mast 14 and is in mesh with a pinion 100 on the end of a motor shaft 101 driven by a motor 102. This motor 102 and its driving connections may be used independently of or in the same embodiment with the motor 4, as desired.

The bar 12 has a pair of angular arms 103 attached thereto (Figs. 7 and 11) at opposite sides of the mast 14. Springs 104 connect the respective arms 103 with the outer ends of a cross-bar 105 adjustably attached to the mast 14. These springs are of the retractile type and are used to counteract the pull of the airplane which tends to hold the bar 12 at right angles to the mast 14 when the plane is flying. It will be noted that when the bar 12 is at right angles to the mast 14, these springs 104 exert no influence on the bar 12; but when the airplane in flight rises or descends, thus inclining the bar 12, the centrifugal force of the airplane tends to bring the bar 12 back to horizontal position. These springs 104 counteract this centrifugal force of the airplane to maintain the bar 12 in horizontal position and allow the airplane to rise and descend properly under control of the control devices. Other means to accomplish this result may be employed, as desired. As clearly shown in Figs. 1 and 7 of the drawings, the angular arms 103 extend upwardly and outwardly from the bar 12 above the axis of the pivot 13. Accordingly, these arms 103 constitute levers to which the upper ends of the springs 104 are connected. When the arms 103 are inclined in either direction from the vertical, the springs 104 tend to prevent the arms 103 from being moved to vertical positions under the influence of the centrifugal force of the airplane. This will be clearly understood by reference to Fig. 1 showing in solid lines the airplane below the plane of the pivot 13. It is clear that the springs 104 resist the tendency of the airplane to rise to the intermediate position shown by dotted lines in Fig. 1.

A counterbalance 106 is attached to the end of the bar 12 opposite to the end to which the airplane is connected, so as to counterbalance the weight of the airplane.

It will now be understood that when the motor is running, the airplane is propelled through an annular course. The lever or stick 78 is operative in an obvious manner to control the elevators and the ailerons. The stick or lever 78 projects upwardly from the case or housing 107, which constitutes a support for the device and which encloses the connections for operating the members 57, 61 and 63. The rudder is operated by the foot lever 87 and its connections.

The construction, arrangement and relationship of the parts comprising the invention may be varied widely without departure from the nature and principle thereof. And in order to carry out the full effect of the operation of the airplane, a suitable landing field 108 may be provided and the airplane may be controlled to take off and land on this field. However, the use of the field is optional.

One end of the link 109 is pivoted to the bar 12 near the mast 14. The other end of this link 109 is pivoted to a rod 110 mounted for vertical sliding movements in guides 111 attached to the mast 14. A ring 112 is attached to the rod 110 and encircles the mast, but does not engage or contact with the mast. The mast 14 has inscribed thereon a series of circumferential equally spaced numbered lines 113 for cooperation with the ring 112. When the airplane rises or descends during flight, the rod 110 is raised or lowered by the vertical swinging movements of the bar 12, thereby moving the ring 112 to different positions along the graduated scale 113, thus furnishing means for measuring the accuracy of the student or operator in the manipulation and control of the airplane at certain levels.

The entire device is a portable unit supported by the housing 107. It is important that the mast be supported vertically and, to afford means for guiding the operator in positioning the device so that the mast is in a perfectly vertical position, we provide, on the top of the housing 107, a level 114 (Fig. 7). By observation of this level, the operator may readily determine if the mast is in a vertical position, and will be guided in making such adjustment.

We do not restrict ourselves in any unessential respects, but what we claim and desire to secure by Letters Patent is:—

1. An airplane instruction device comprising an airplane having wings, ailerons in connection with the wings, mechanism for propelling the airplane in flight, a device for guiding the airplane in flight, and mechanism remote from the airplane and connected with the ailerons for moving the ailerons simultaneously to oppositely inclined positions, and thereby tilting the airplane in conformity with the tilted positions indicated by the ailerons.

2. An airplane instruction device comprising an airplane having wings, ailerons in connection with the wings, propeller mechanism for propelling the airplane in flight, means for guiding the airplane during flight, a lever mounted at a distance from the airplane, and connections from the lever for moving the ailerons to different positions of inclination with respect to the wings, and thereby causing the airplane to tilt in conformity with the inclination of the ailerons.

3. An airplane instruction device comprising an airplane having wings, ailerons in connection with the wings, propeller mechanism for propelling the airplane in flight, a device for guiding the airplane during flight, a lever, a support for the lever at a distance from the airplane, and connections operated by said lever for operating the ailerons while the airplane is in flight.

4. An airplane instruction device comprising an airplane having wings, ailerons in connection with the wings, propeller mechanism for propelling the airplane in flight, means for guiding the airplane during flight, a lever pivoted at a distance from the airplane, connections operated by said lever for moving said ailerons in opposite directions while the airplane is flying, and mechanism for tilting the airplane upwardly or downwardly as desired.

5. A device of the character described comprising an airplane having wings, ailerons in connection with the wings, a rotary support for the airplane, mechanism for propelling the airplane in flight and thereby rotating said support, a lever pivotally supported at a distance from the airplane, elevators in connection with the airplane, and connections operated by said lever for operating said elevators to direct the airplane upwardly or downwardly as desired.

6. A device of the character described comprising an airplane having wings, ailerons in connection with the wings, a rotary support for the airplane, mechanism for propelling the airplane in flight and thereby rotating said support, a lever pivotally supported at a distance from the airplane, elevators in connection with the airplane, connections operated by said lever for operating said elevators to direct the airplane upwardly or downwardly as desired, and connections for operating said ailerons simultaneously with the operation of said elevators or independently, as desired.

7. An airplane instruction device comprising an airplane, a stabilizer in connection with the airplane, elevators hinged to the stabilizer, propeller mechanism for propelling the airplane in flight, a device for guiding the airplane during flight, a lever pivoted upon a stationary support at a distance from said airplane, and mechanism controlled by said lever for operating said elevators to direct the airplane upwardly or downwardly as desired.

8. An airplane instruction device comprising an airplane, ailerons in connection with the airplane, propeller mechanism for flying the airplane, means for guiding the airplane in flight, a stationary support, a lever mounted on said support, and connections operated by said lever for operating said ailerons as desired while the airplane is in flight.

9. An airplane instruction device comprising an airplane, mechanism for flying and guiding the airplane, a rudder for changing the direction of the longitudinal axis of the airplane, a stationary support, a lever mounted in said stationary support, and connections from said lever for operating said rudder.

10. An airplane instruction device comprising an airplane, a rudder for changing the direction of the longitudinal axis of the airplane, mechanism for flying the airplane, a stationary support, means supported in part by said stationary support for operating said rudder while the airplane is in flight, and additional mechanism for causing the airplane to tilt laterally while flying.

11. An airplane instruction device comprising an airplane, a rudder in connection with the airplane, elevators in connection with the airplane, mechanism for flying the airplane, a lever, a stationary support for the lever, and connections operated by said lever for operating said rudder and said elevators simultaneously or independently, as desired.

12. An airplane instruction device comprising an airplane, a rudder in connection with the airplane, elevators in connection with the airplane, a lever, means for supporting the lever at a distance from the airplane, means for supporting and guiding the airplane during flight, and connections operated by the lever controlling said rudder and said elevators.

13. An airplane instruction device comprising an airplane having wings, ailerons, elevators and a rudder, mechanism for flying and guiding the airplane during flight, a lever pivotally supported at a distance from the airplane, and mechanism operated by said lever for operating said ailerons and said elevators to different inclined positions and for operating said rudder.

14. An airplane instruction device comprising an airplane, mechanism for propelling said airplane in a circular course, a stationary support, control mechanism in said support, elevators in connection with the airplane, ailerons in connection with the airplane, and connections from said control mechanism for operating said ailerons and said elevators while the airplane is flying.

15. An airplane instruction device comprising an airplane, a support for guiding the airplane in flight, propeller mechanism for propelling the airplane and said support to fly the airplane, mechanism on the airplane for elevating and lowering the airplane while flying, and connections remote from the airplane for operating said last named mechanism.

16. An airplane instruction device comprising an airplane, a support for guiding the airplane in flight, propeller mechanism for propelling the airplane and said support to fly the airplane, mechanism for elevating and lowering the airplane while flying, and devices connected with said support counteracting the tendency of the airplane to hold said support in a horizontal position.

17. An airplane instruction device comprising an airplane, a rotary mast, a support in connection with said mast for supporting and guiding the airplane, propeller mechanism for propelling the airplane, and means cooperating with said support overcoming the tendency of the centrifugal force of the airplane to hold said support in horizontal position and enabling the airplane to move upwardly or downwardly.

18. An airplane instruction device comprising an airplane, a rotary mast, a support pivoted to said mast for vertical swinging movements, means connecting said support with the airplane, mechanism for propelling the airplane in flight to rotate said support and said mast, and means overcoming the tendency of centrifugal force of the airplane to hold said support at rightangles to said mast.

19. An airplane instruction device comprising an airplane, a rotary mast, a support pivoted to said mast for vertical swinging movements, means connecting said support with the airplane, propeller mechanism for propelling the airplane in flight to rotate said support and said mast, means overcoming the tendency of the centrifugal force of the airplane to hold said support at right-angles to said mast, and elevators on the airplane for causing the airplane to ascend to descend.

20. An airplane instruction device comprising an airplane, a rotary mast, a support pivoted to said mast for vertical swinging movements, means connecting said support with the airplane, propeller mechanism for propelling the airplane in flight to rotate said support and said mast, means overcoming the tendency of the centrifugal force of the airplane to hold said support at right-angles to said mast, elevators on the airplane for causing the airplane to ascend or descend, a control device supported independently of said airplane, and connections from said control device for operating said elevators.

21. An airplane instruction device comprising an airplane, mechanisms for flying and guiding the airplane in a circular course, a rudder for changing the course of the airplane, elevators for causing the airplane to ascend and descend, connections for operating said rudder and said elevators respectively, and means supported independently of the airplane for operating said connections.

22. An airplane instruction device comprising an airplane, a mast supporting the airplane, mechanism for flying and guiding the airplane in a circular course around the mast, elevators for causing the airplane to ascend and descend, and means cooperating with said mast and controlled by said airplane for measuring the accuracy of the control of the airplane at different levels.

THEODORE M. PARDUE.
JOHN L. PARDUE.